A. JENSEN.
SANITARY PUMP.
APPLICATION FILED MAY 8, 1909.

1,007,448.

Patented Oct. 31, 1911.
2 SHEETS—SHEET 1.

WITNESSES
F. C. Fliedner
Nellie B. Keating

INVENTOR
A. Jensen,
BY
F. M. Wright,
ATTORNEY

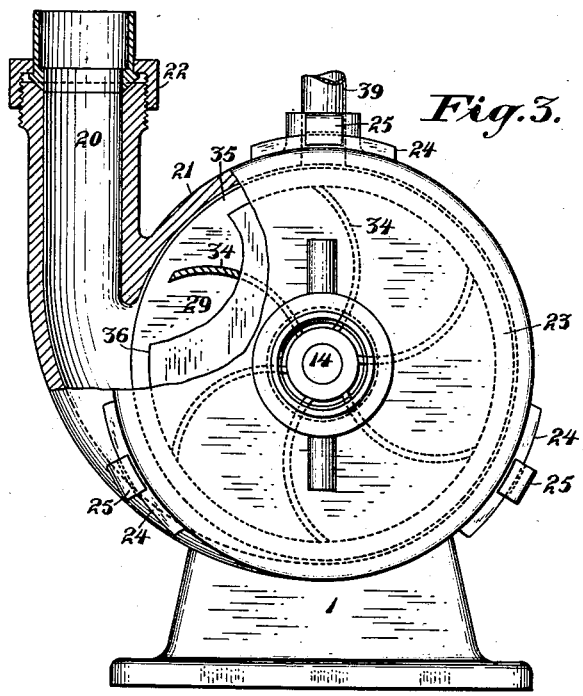
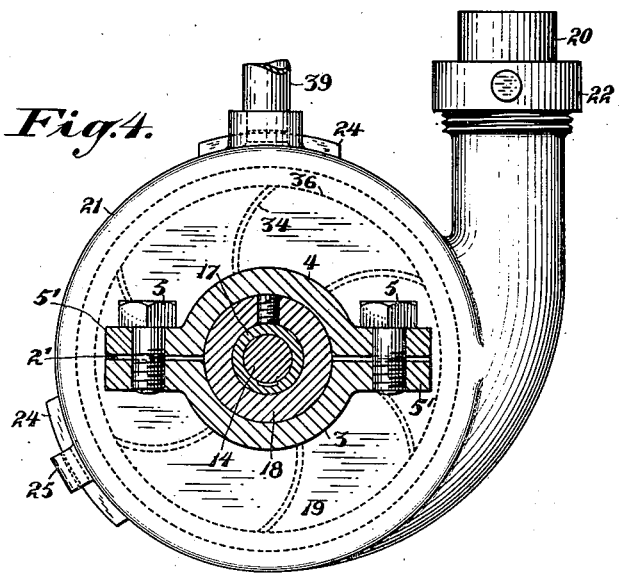

UNITED STATES PATENT OFFICE.

AAGE JENSEN, OF EUREKA, CALIFORNIA.

SANITARY PUMP.

1,007,448.  Specification of Letters Patent.  Patented Oct. 31, 1911.

Application filed May 8, 1909. Serial No. 494,897.

*To all whom it may concern:*

Be it known that I, AAGE JENSEN, a citizen of the United States, residing at Eureka, in the county of Humboldt and State of California, have invented new and useful Improvements in Sanitary Pumps, of which the following is a specification.

The present invention relates to a sanitary pump for pumping liquids such as milk, cream, wine or beer, which are affected by bacterial growth.

Since, in pumping such liquids, it is necessary to clean and sterilize the pump and its connections after each operation, the object of the present invention is to provide a pump which can be taken apart in a very short time, and all the parts of which can be readily cleaned.

A further object is to provide a pump which will have no metallic surfaces rubbing against each other which come in contact with the liquid passing through the pump. The rubbing of such surfaces causes a wear of the metal, and consequently affects the taste or quality of the liquid coming in contact with said surfaces.

A further object is to provide a pump so constructed as to absolutely exclude from the pump chamber the least particle of the oil used for lubrication of the journals of the pump.

Figure 1:
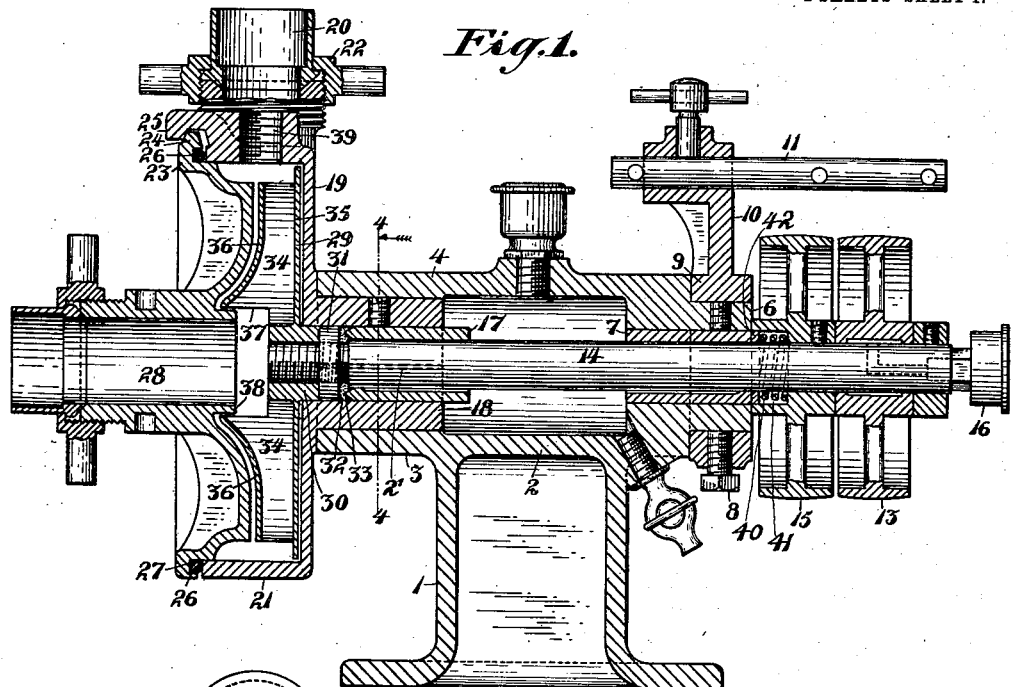
Figure 2:
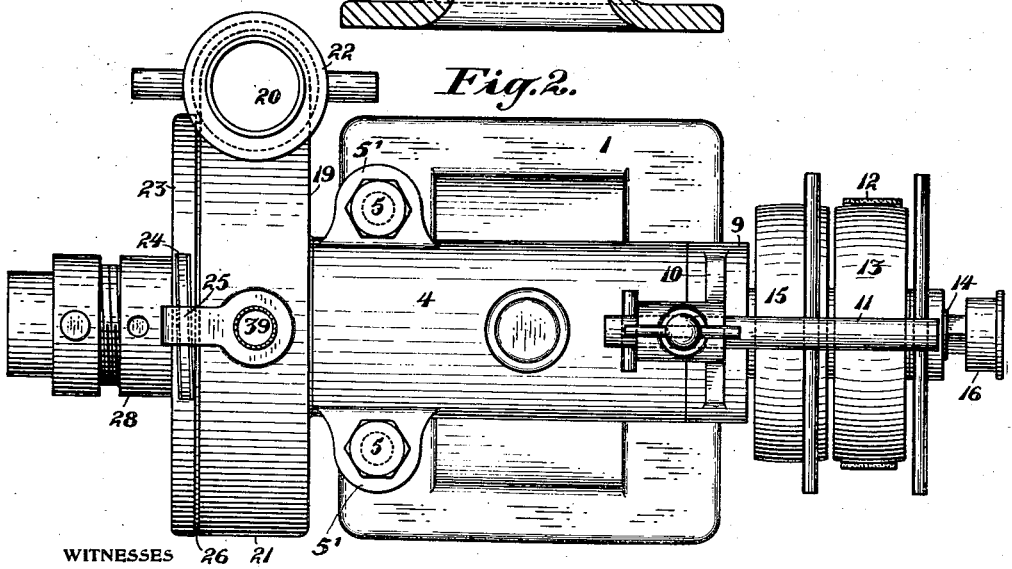

In the accompanying drawing, Figure 1 is a longitudinal sectional view of the pump; Fig. 2 is a plan view; Fig. 3 is an end view, the outlet pipe being shown partly in section; Fig. 4 is a cross section on the line 4—4 of Fig. 1.

Referring to the drawing, 1 indicates a base, formed integral with a cylindrical bearing 2, one end of which is diametrically split, as shown at 2', through lugs 5' extending from the upper and lower halves 4 and 3, through which pass screws 5 through lugs 5', which screws can thus clamp between said lugs the pump casing extension, hereinafter described. In one end of said bearing is secured, by a screw 6, a bushing 7, and on said end, which is reduced in diameter, is secured, by a screw 8, a collar 9, carrying a bracket 10 for a guide 11 of a belt 12 for a pulley 13 loose on a shaft 14, and a pulley 15 tight thereon. In the end of said shaft is a grease cup 16 for lubricating the bearing of the loose pulley. Said shaft 14 passes through said bushing 7 and also through a bushing 17 secured within an extension 18 of the pump casing 19. By means of the screws 5, the two half bearings 3, 4, can be clamped tight around the extension 18 of the pump casing, but also, by reason of this construction, the outlet 20 of said pump casing can be set at any desired angle, by first loosening the clamping screws 5, then turning the pump casing on its axis to the desired position, and then again clamping the screws 5.

The pump casing is formed with a cylindrical wall 21, from which extends tangentially the outlet conduit 20 adapted to be connected by a sanitary coupling 22 to a pipe for conducting the liquid to a point desired. The pump chamber is closed by means of a cover 23 having a hollow hub or inlet 28 and having a plurality, three being here shown, of inclined lugs 24 adapted to engage tongues 25 extending over the edge of said cover from the cylindrical wall 21 of the casing. By this arrangement said cover can be quickly attached and detached. A rubber ring 26 in an annular groove 27 in the cover is compressed when the lugs 24 are moved in one direction beneath the tongues 25, thereby sealing the joint between the cover and the pump casing.

The runner 29 is formed with a hub 30 screwed on to the end of the shaft 14, the thread of said screw being in the same direction as that of rotation of the runner. Said hub abuts against a collar 31 on the shaft 14, between which and the end of the bushing 17 is interposed a ring 32 of fiber, hard rubber, or other suitable material. Said ring 32 is grooved, as shown at 33, and the end of the bushing 17 is beveled and fits in said groove. The central portion of the bearing between the bushings 7 and 17 forms an oil chamber, for lubricating the bearing of the shaft 14 in the bushing 17, and the grooved ring 32 prevents the further passage of the oil along the shaft 14, and into the pump chamber.

The hub of the pulley 15 is recessed, as shown at 41, to receive a coiled spring 40 which bears against a washer 42 contained in said recess, which in turn bears against the edge of the bushing 7, and thus presses the fiber gasket 32 against the bushing 17, and is efficient to prevent oil entering the pump chamber, especially when the pump is not in operation.

From the hub 30 of the runner extend the rear portions of curved blades 34, connected at their rear edges to a flat circular disk 35 extending from the hub 30 and at their front edges to a conoidal wall 36, the front portions of the inner ends of the blades being cut away, as shown at 37.

The hollow hub 28 has an extension 38 projecting past the inner edge of the conoidal wall 36 and also partly past the cut away inner edges of the blades 34, so that the liquid passing through the hollow hub is conducted into the pump chamber and between the curved blades of the runner, and cannot pass between the front wall of the runner and the cover 23, the object of this arrangement being to prevent any of the liquid passing between surfaces which can come in contact with each other, which contact might affect the taste or quality of the liquid. The rear wall or flat circular disk 35 is extended beyond the edges of the blades 34, so that its area is greater than that of the wall 36, and the greater pressure against said disk 35 than against the wall 36 forces the runner rearwardly, screwing it on the shaft 14 and thus compresses the ring 32 between the collar 31 and the bushing 17, and makes a tight joint thereat, and also takes up the seat on the friction ring 32.

39 indicates an opening in which may be attached a pressure gage pipe or priming cup, not shown.

The pump can be driven direct by a turbine or by an electric motor instead of by a belt.

I claim:—

In a centrifugal pump, the combination of a base, a cylindrical bearing formed integral with said base and diametrically split at one end, a pump casing having a cylindrical extension within said split end, means to draw together the two halves of said split end to clamp said extension therein, a bushing secured within the other end of the cylindrical bearing and spaced from the first bushing to form with the cylindrical bearing an oil chamber, a shaft passing through said bushings, a runner within said casing secured to one end of said shaft, pulleys on the other end of said shaft, and means for preventing the passage of oil from said oil chamber to said runner, substantially as described.

In testimony whereof I have hereunto set my hand in the presence of two subscribing witnesses.

AAGE JENSEN.

Witnesses:
J. M. NISSON,
FRANK NAZRO.